July 21, 1959     E. A. STALKER     2,895,667
ELASTIC FLUID MACHINE FOR INCREASING THE PRESSURE OF A FLUID
Filed April 9, 1954
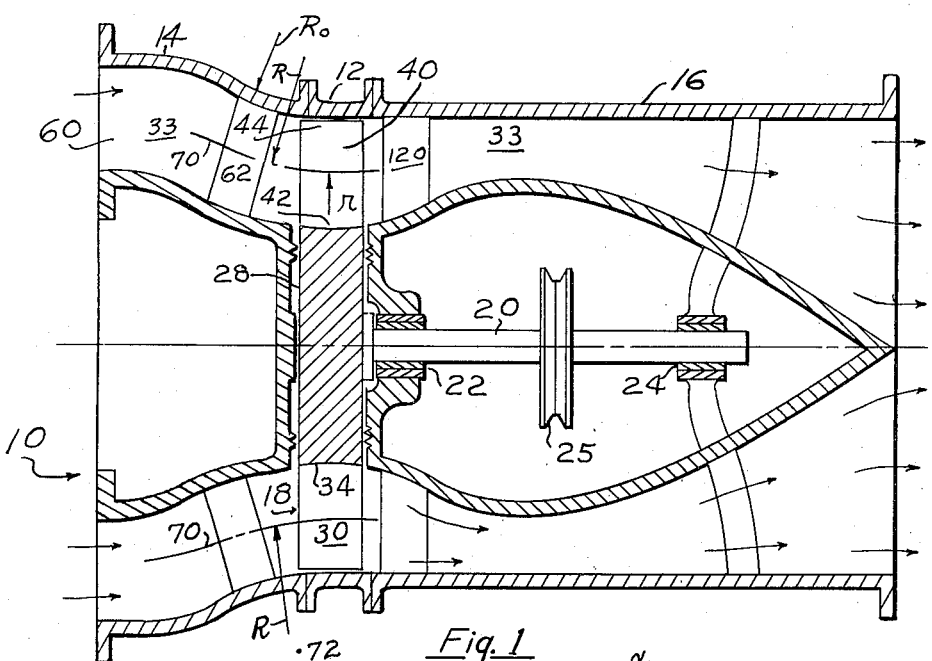
Fig. 1
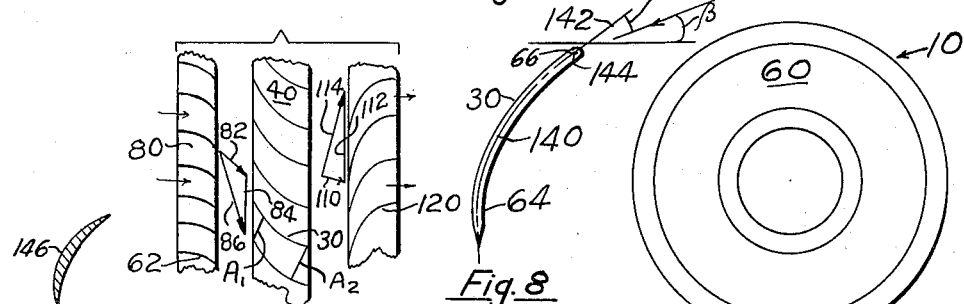
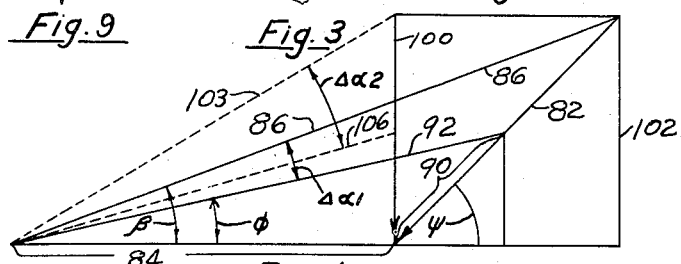
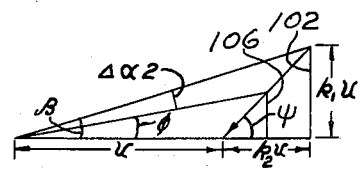
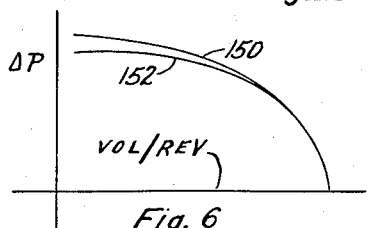
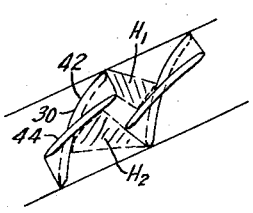
INVENTOR.
Edward A. Stalker United States Patent Office 2,895,667
Patented July 21, 1959

2,895,667
ELASTIC FLUID MACHINE FOR INCREASING THE PRESSURE OF A FLUID

Edward A. Stalker, Bay City, Mich.

Application April 9, 1954, Serial No. 422,153

7 Claims. (Cl. 230—120)

This invention relates to compressors, blowers and the like of the axial flow type.

An object of the invention is to provide a compressor of high efficiency over a wide range of volume flow per revolution.

Another object is to provide a sheet stock compressor for economical fabrication.

Still another object is to provide a compressor for creating a large static pressure rise and a large range of volume flow per revolution at high efficiency.

Other objects will appear from the description drawings and claims.

The above objects are accomplished by the means illustrated in the accompanying drawings in which—

Fig. 1 is an axial section through a compressor according to this invention representing a preferred form thereof;

Fig. 2 is a front view of the compressor of Fig. 1;

Fig. 3 is a fragmentary development of the blading of the rotor and the guide vanes;

Fig. 4 is a diagram of the fluid flow vectors pertaining to the inlet guide vanes and the rotor blades of this invention;

Fig. 5 is a diagram of fluid flow vectors for another condition of flow;

Fig. 6 is a graph of pressure rise in the pumped fluid versus volume of flow per revolution;

Fig. 7 is a tip view of a rotor blade;

Fig. 8 is a chordwise section through a rotor blade; and

Fig. 9 shows an alternate blade section for a rotor.

In this invention the blades of the rotor preferably have passages between them which expand greatly in cross sectional area so that a large static pressure rise occurs in these passages. The rotation of the rotor tends to cause a large centrifugal pressure near the tips of the blades arising from centrifugal action on the radially directed column of fluid between the blades, especially that portion of the column adjacent to the rear end of the rotor. This pressure, if allowed to exist, would cause a reduction in flow through the rotor and at the tips of the stator blades would cause very flat angles of approach to the blades, leading to inefficiencies.

Where inlet guide vanes are used to put a whirl into the pumped fluid a similar unfavorable condition exists in the passages between vanes.

In this invention provision is made to offset the undesirable features which would result from a large static pressure rise in the rotor and the counterwhirl in the inlet guide vanes by shaping the guiding surfaces of the case and rotor to provide a negative centrifugal pressure, that is one acting radially inward.

The combination of counter rotation inlet guide vanes, rotor configuration, and a unique stator provides a compressor which can discharge its flow of fluid axially with high efficiency and pressure over a wide range of volume flow per revolution.

Referring now to the drawings, the compressor is indicated generally as 10 in Figs. 1 and 2. It has the case means comprised of the rotor case 12, the inlet duct 14, and the exit duct 16. The rotor 18 is mounted on the shaft 20 supported in the bearings 22 and 24 to be driven by pulley 25. The rotor hub 28 carries the rotor blades 30 peripherally spaced about the rim 34 in the passages 33 of the case means. The blades are contoured to the inside surface of the rotor case and preferably conform to this surface along substantially their whole tip length.

The blades 30 have the rotor flow passages 40 between them and are shaped to give a large diffusion ratio to these passages. With a large diffusion ratio the velocity at the exit of each passage is small compared to the velocity at the corresponding inlet. Then the flow leaving the rotor has a very small axial velocity and the direction of the absolute velocity makes a small angle with the plane of rotation. This small angle makes the provision of an efficient stator difficult.

As shown in Figs. 1, 3 and 7 the blades 30 have a very large curvature in their root sections 42 and substantially less curvature at their tip sections 44. Because of the curvature in the blades the cross sectional widths of the passages increase rearward, that is downstream, so that each exit cross sectional area $A_2$ is much larger than the corresponding inlet cross sectional area $A_1$. The diffusion ratio is the ratio of $A_2$ to $A_1$. Preferably this should be of the order of 1.3 or more.

When the rotor is rotated fluid enters the compressor inlet opening 60, Fig. 1 and flows through the inlet guide vanes 62 into the rotor passages 40. In the rotor the centrifugal pressure due to rotation about the axis tends to create a substantial static pressure rise in the region of the blade tips in addition to the rise due to diffusion. Because of the resulting balance of pressures and energies along the radius or span of the blades the mass flow through the rotor at the tip ends of the blades will be relatively small. This is very undesirable with respect to the efficiency of both the rotor and the stator.

In this invention the mass flow through the rotor in the neighborhood of the blade tips is increased by creating a pressure to offset, at least in part, the centrifugal pressure arising from the rotation of the rotor. This is accomplished in part by giving the inlet duct a negative curvature about one or more centers lying away from the axis of rotation. Thus in Fig. 1 the radius of curvature R of the center or mean line 70 of the passage has its center at 72 on the far side of this center line from the axis of rotation of shaft 20 and thus the center line of the flow channel in the area of the inlet guide vanes, the rotor, and the stator blades is curved in an axial plane so that it is convex to the axis of rotation.

When the pumped fluid is drawn into the inlet duct a negative centrifugal pressure is created acting toward the axis of rotation, that is in opposition to the centrifugal pressure from the rotation about the shaft axis. Due to the inertia of the fluid this centrifugal pressure can persist into the rotor and influence the flow leaving the rotor.

When the centrifugal pressure from rotor rotation is offset by the negative centrifugal pressure arising from negative curvature of the flow in axial planes, more fluid flows through the rotor at the outer ends or tips of the blades. This increases the efficiency of the rotor and of the stator downstream therefrom.

The efficiency of the rotor is increased because there is a greater pressure rise near the root ends of the blades away from the case and the gaps between the blade tips and the case.

The efficiency of the stator is increased because of the greater inlet angle of the stator blades.

Besides improving the flow through the rotor, the curved inlet portion of the case means also improves the action of the inlet guide vanes 62 which are also designed to cause a rotation of the fluid about the shaft axis. This is discussed further subsequently.

In order to achieve a very high total head pressure ratio the rotor blades, Figs. 3, 7 and 8, are preferably curved chordwise to have their aft ends 64 directed more nearly parallel to the axis of rotation (axis of shaft 20) than to the direction of the nose portion thereof as indicated by the tangent 142 to the mean camber line 140 at its forward end in Fig. 8. The curvature increases the cross sectional areas of the exits of the rotor passages relative to their inlet areas which increases the density of the fluid in the rotor passages. In turn this tends to increase the rotor-rotational centrifugal pressure adjacent to the blade tips which as remarked earlier is undesirable. Consequently an inlet duct curvature to oppose the rotor-rotational centrifugal pressure becomes very significant with curved blades and particularly so with curved blades of large solidity at their root ends, since the closer the blades are spaced the greater effect the blades have on the fluid flowing between them.

The blades are placed close together to achieve a solidity greater than about one at the mean line 70 and preferably greater than 2 and less than 10. It is also preferable that the leading edge of the leading blade of a pair of rotor blades be chordwise forward of about the mid point of the chord of the following blade.

With the blades close together it is desirable to make the blades thin and with blade sections of constant thickness throughout substantially their whole chordwise length to exclude constricting throats in the passages between the blades. These considerations also lead to the selection of sheet stock blades and low costs of fabrication.

In order to extend the range of weight flow per revolution of the rotor, the inlet guide vanes 62 (Fig. 3) are curved backward relative to the direction of rotation of the rotor 18. Thus the vanes deflect or rotate the flow of fluid coming through their passages 80 in a peripheral direction counter to the direction of rotation of the rotor blades 30. See Fig. 3.

In Figs. 3 and 4 the flow vector aft of the inlet guide vanes is 82 when the compressor is passing 100% of the mass flow for which it is designed. The peripheral velocity of segments of the rotor blades at a selected radius is 84, and the flow vector relative to the segments is then 86. If for instance the volume of flow through the compressor is decreased 50% as it may be in the course of its use the vector of the flow leaving the vanes may be represented by 90. Then the flow vector relative to the segments of the rotor blades will be 92 and the change in angle of incidence of each segment will be $\Delta\alpha_1$.

If vanes were employed which gave no whirl to the fluid the vector for fluid leaving the vanes would be 100 (Fig. 4) equal to the axial velocity component 102 of vector 82. For the same peripheral component 84 the relative velocity is 103. If the volume of the flow is decreased by 50% the new relative vector is 106 making the change in angle of incidence $\Delta\alpha_2$.

A comparison in Fig. 4 of the changes in angle of incidence $\Delta\alpha_1$, with $\Delta\alpha_2$, shows that with backward curved vanes the change in angle of incidence is only about one-half of the change for zero backward curvature which would give no whirl to the fluid leaving the vanes. This relationship can also be shown by calculation of the changes in angle of incidence.

As shown in Figs. 4 and 5 the peripheral component of the velocity of the fluid leaving the inlet guide vanes can be expressed as $k_2$, times U. The axial component can be expressed as $k_1$ U. Then $$\tan \psi = \frac{k_1 U}{k_2 U} \quad (1)$$

and $$\tan \phi = \frac{k_1 U}{U + k_2 U} \quad (2)$$

whence $$\tan \phi = \frac{k_2}{1+k_2} \tan \psi \quad (3)$$

and $$\Delta\alpha = \beta - \phi \quad (4)$$

Table I shows the changes in angle of attack $\Delta\alpha_1$, for the compressor with counter whirl vanes and $\Delta\alpha_2$ for vanes providing axial flow. These are calculated according to Equations 1–4. In each case the axial velocities at the selected initial conditions are equal, that is, $k_1=k_2$ and $k_1/k_2=1$. The axial velocities are proportional to $k_1$ since the peripheral velocity U is the same in both cases. Now let $k_1$ and $k_2$ vary equally.

*Table I*

| $k_1$ | $\Delta\alpha_1$ | $\Delta\alpha_2$ |
|---|---|---|
| .4 | 10°–40′ | 23°–10′ |
| .6 | 6°–6′ | 14°–0′ |
| .8 | 2°–4′ | 6°–20′ |
| 1.0 | 0–0 | 0–0 |

It is clear from this table that the counter whirl inlet vanes greatly reduce the changes in angle of attack.

It can also be shown that for a small value of $\beta$ that $\Delta\alpha$ remains substantially constant and small for a wide variation in axial velocity which determines the magnitude of the volume of flow through the compressor.

By using the backward curved vanes in proper relation to the other geometric variables the axial flow rotor is made to function over a wide range of volume flow with a sufficiently small variation in angle of incidence to preclude separation of the flow from the blade surfaces. This insures high pressure rises and high efficiency over the useful range of operation.

It may be deduced from the equations that the smaller the angle $\psi$ the less variation there will be in the angle of attack $\alpha$ for a given percentage variation in the axial velocity which determines the volume flow. Accordingly it is desirable for the best results to make $\psi$ less than about 65° and pitch angle $\beta$ less than about 35°. If it is desired to sustain a high pressure rise substantially to the condition of zero volume flow, the pitch angle $\beta$ may be made about equal to the stall angle of attack of the blades, that is about 12 to 16 degrees or less.

Since the counterflow inlet guide vanes limit the range of angles of attack required by the blades of the rotor the latter can be made of thin sheet metal and function with high efficiency over a large range of operation.

The flow leaves the rotor with the relative velocity 110. The peripheral velocity of the rotor blade is 112 giving the vector 114 relative to the stator blades 120. These straighten out the flow and direct it substantially axially along the exit duct portion 33.

The preferred magnitude of the radius R of the curvature of the center line 70 is related to the pitch angle $\beta$ of the rotor blades at the center line 70.

The outward centrifugal pressure at the mean line 70 due to the rotation of the rotor about the rotor axis is closely $$C.P. = \frac{\rho U^2}{r}$$

where $\rho$ is the mass density of the fluid, U is the peripheral velocity at center line 70 and r is the radius to this center line.

As shown in Fig. 4 the axial velocity entering the rotor passages is U tan $\beta$. The inward centrifugal pressure at the mean or center line 70 due to curvature of the flow at radius R is then closely $$\frac{\rho U^2 \tan^2 \beta}{R} \quad (5)$$

These two pressures should be equal. That is $$\frac{\rho U^2}{r} = \frac{\rho U^2 \tan^2 \beta}{R} \quad (6)$$

whence $$R = r \tan^2 \beta \quad (7)$$

Some variation on either side of this value of R will still produce improved performance. The radius R should lie between the limits $$R_1 = r \tan^2 (\beta + 15°) \quad (8)$$

and $$R_2 = r \tan^2 (\beta - 0.5B) \quad (9)$$

Preferably the radii $R_o$ of the outer case 12 should be equal to the radius R to the mean line 70 reduced by one-half the blade height. However it may be less than R by greater amounts.

The radius to the concave surface of the hub rim should be equal to R plus one-half the blade span. The centers of the various radii need not coincide.

When the blades have a thin constant thickness blade section such as sheet metal provides, the range of volume flow per revolution tends to be limited by these characteristics. It is especially important then with this type of blade section to employ means to extend the range of the rotor blades. In this invention this is accomplished by the use of the counter flow guide vanes and the negative curvature in the passages of the inlet and rotor as already described.

An enlarged rotor blade 30 is shown in Fig. 8 of the preferred cross sectional shape. It has a mean camber line 140 which is chiefly curved along the rear half. Angles of incidence α are to be referred to the tangent 142 to the mean camber line at the center 144 of the nose radius.

For economy of construction and to facilitate close peripheral spacing of the blades they are preferably made with blade sections of substantially constant thickness from substantially the leading edge of the trailing edge. As shown in Fig. 8 each blade has a constant thickness chordwise with faired nose and tail portions. These portions extend inward from the blade edges by one or more times the blade thickness and are preferably limited to a small length equal to only several times the blade thickness.

The blades may also be of varying thickness with front and rear portions tapering from a locality of maximum thickness fore and aft respectively to the leading and trailing edges as shown in blade 146 in Fig. 9.

The forward portions of the blades are preferably directed more nearly parallel to the plane of rotation (see Fig. 8) than normal thereto, as determined by the direction of the tangent to the mean camber line of the fore portion relative to the plane of rotation. Preferably the aft portion, as determined by its tangent to its mean camber line is more nearly parallel to the axis of rotor rotation than to the plane of rotation of the rotor.

The machines of this invention are for use in moving large volumes of elastic fluid against substantial back pressures. Accordingly the tips of the blades fit closely to and conform to the contours of the surface of the case adjacent to them.

Furthermore the ratio of the maximum radius of the hub to the radius of the blade tips is preferably greater than 0.5 to preclude back-flow in the region adjacent to the blade roots. The blade roots are highly cambered to serve this same purpose.

It is desirable to have a graph of pressure versus volume flow per revolution like 150 in Fig. 6. If as shown the curve has everywhere a negative slope the operation of the compressor will be stable. That is it will exclude surging. The curve preferably should be at least horizontal as shown by 152 although some positive slope in some installations can be tolerated particularly near the end of the curve for very small volume of flow. To achieve at least a horizontal curve close to the condition of zero flow the pitch angle should be less than about 16°.

It will now be clear that I have disclosed a unique machine for efficiently increasing the pressure of a fluid to relatively large values while providing a wide range of volume flow per revolution. To accomplish these results the blades of the rotor are given a relatively large camber angle in relation to the pitch angle β of the blades so that the ratio of exit to inlet cross sectional areas of the passages between blades is large. This tends to create a large static pressure in the neighborhood of the blade tips due to centrifugal pressure on the fluid in the rotor passages especially near the exit ends of the passages where the fluid is relatively slow moving and the density may be significantly increased.

The low axial velocity of the fluid leaving the rotor passages tends to provide low efficiency of action on the stator and to limit the range of satisfactory operation.

The backward curved inlet guide vanes, rotor and stator blades cooperate to increase the range of volume flow through the compressor per revolution of the rotor. The inlet guide vanes and rotor cooperate through the reduced ranges of angles of attack required by the rotor for an enlarged range of volume flow. For efficiency an axial flow compressor requires a stator aft of the rotor to eliminate the spin in the flow. Stator blades in themselves have the same restricted range of useful angles of attack as rotor blades and so the passages between them would not pass an enlarged range of volume flow. However when the stator passage decreases in cross sectional area rearward the stator passage flow is accelerated and the stator blades can handle an increased range of volume flow. Both the backward curved inlet guide vanes and the accelerating stator are required for the compressor to pass the fluid over an augmented range of volume flow per revolution of the rotor.

By the combination of features of this invention the above tendencies are precluded and the compressor is brought to high pressure operation with high efficiency and a large range of volume flow per revolution. A negative centrifugal pressure on the fluid is introduced by curving the surfaces of the case and/or the rim surface of the rotor hub. Then these surfaces curve the flow in axial planes creating a centrifugal pressure radially inward. This inward pressure may be such that the centrifugal pressure in the fluid is substantially constant along the radial extent of the flow cross section.

The range of operation is increased by the provision of inlet guide vanes turning the flow against the direction of rotation of the rotor and the provision of a stator of unique proportions.

While I have illustrated a specific form in this invention it is to be understood that I do not intend to limit myself to this exact form but intend to claim my invention broadly as indicated by the appended claims.

I claim:

1. In combination in an axial flow compressor for raising the pressure of an elastic fluid, a case means comprising an inlet duct, a rotor case and an exit duct, a rotor having a hub mounted in said rotor case for rotation about an axis and defining a flow channel with said rotor case, said channel registering with said inlet and exit ducts to conduct a flow of fluid, and a plurality of peripherally spaced axial flow blades carried on said hub with rotor flow passages between said blades for conducting said fluid, a plurality of axial flow guide vanes positioned in said inlet duct upstream adjacent to said rotor with guide vane flow passages between said vanes, said vanes being curved backward relative to the direction of rotation of said rotor to direct fluid counter to the direction of rotation of said rotor blades to increase the range of volume flow per revolution of said rotor, said inlet duct having its center line curved in an axial plane to be convex to said axis of rotation for producing a centrifugal pressure in said fluid toward said axis in said guide vane passages, said vanes each being positioned in a curved portion of said inlet duct, said rotor blades and said guide vanes cooperating with said inlet duct to pump a large range of volume of fluid through said compressor with a limited range of angles of attack for said rotor blades.

2. In combination in an axial flow compressor for raising the pressure of an elastic fluid, a case means comprising an inlet case having an inlet duct, a rotor case and a stator case having an exit duct, a rotor having a hub mounted in said rotor case for rotation about an axis and defining a flow channel with said rotor case, said channel registering with said inlet case and said exit case to conduct a flow of fluid, a plurality of peripherally spaced axial flow blades carried on said hub with rotor flow passages between said blades, a plurality of stator blades peripherally spaced across said stator case, said rotor blades tending to limit the range of fluid volume flow through said rotor and stator near the outer ends of said blades thereof, and means to extend said range of fluid volume flow in said compressor comprising a plurality of vanes positioned in said inlet case upstream adjacent to said rotor, said vanes being curved in a direction opposite to the direction of rotation of said rotor to direct fluid toward said rotor blades counter to their direction of rotation, said vanes tending to produce a centrifugal pressure in said fluid between said vanes acting radially outward, said inlet case having negatively curved walls at least along the inner ends of said vanes to create a centrifugal pressure toward said axis to offset said centrifugal pressure in the regions near said vane and rotor blade tips and improve the efficiency and operation of the portions of said stator blades receiving fluid from said region, the effects of said vanes and inlet case on said fluid persisting up to said stators in operation of said compressor.

3. In combination in an axial flow compressor for raising the pressure of an elastic fluid, a case means comprising an inlet duct, a rotor case and an exit duct, a rotor having a hub mounted in said rotor case for rotation about an axis and defining a flow channel with said rotor case, said channel registering with said inlet and exit ducts to conduct a flow of fluid, and a plurality of peripherally spaced axial flow blades carried on said hub with rotor flow passages between said blades for conducting said fluid, a plurality of axial flow guide vanes positioned in said inlet duct upstream adjacent to said rotor with guide vane flow passages between said vanes, said vanes being curved backward relative to the direction of rotation of said rotor to direct fluid counter to the direction of rotation of said rotor blades to increase the range of volume flow per revolution of said rotor, said inlet duct having its center line curved in an axial plane to be convex to said axis of rotation for producing a centrifugal pressure in said fluid toward said axis in said guide vane passages, said vanes each being positioned in a curved portion of said inlet duct and a plurality of peripherally spaced stator blades in said exit duct with stator flow passages therebetween for receiving said fluid from said rotor passages, the radially inner wall of said stator duct diverging radially outward relative to the outer wall thereof reducing the cross sectional areas of said stator passages to accelerate flows of said fluid therein to accommodate said increased range of volume flow of said fluid through said rotor passages, said guide vanes and stator blades cooperating to increase the range of volume flow through said compressor.

4. In combination in an axial flow compressor for raising the pressure of an elastic fluid, a case means comprising an inlet duct, a rotor case and an exit duct, a rotor having a hub mounted in said rotor case for rotation about an axis and defining a flow channel with said rotor case, said channel registering with said inlet and exit ducts to conduct a flow of fluid, and a plurality of peripherally spaced axial flow blades carried on said hub with rotor flow passages between said blades for conducting said fluid, a plurality of axial flow guide vanes positioned in said inlet duct upstream adjacent to said rotor with guide vane flow passages between said vanes, said vanes being curved backward relative to the direction of rotation of said rotor to direct fluid counter to the direction of rotation of said rotor blades to increase the range of volume flow per revolution of said rotor, and a plurality of peripherally spaced stator blades in said exit duct with stator flow passages therebetween for receiving said fluid from said rotor passages, the radially inner wall of said stator duct diverging radially outward relative to the outer wall thereof reducing the cross sectional areas of said stator passages to accelerate flows of said fluid therein to accommodate said increased range of volume flow of said fluid through said rotor passages, said guide vanes and stator blades cooperating to increase the range of volume flow through said compressor.

5. In combination in an axial flow compressor for raising the pressure of an elastic fluid, a case means comprising an inlet duct, a rotor case and an exit duct, a rotor having a hub mounted in said rotor case for rotation about an axis and defining a flow channel with said rotor case, said channel registering with said inlet and exit ducts to conduct a flow of fluid, and a plurality of peripherally spaced axial flow blades carried on said hub with rotor flow passages between said blades for conducting said fluid, said rotor case and said hub cooperating with said rotor blades to define rotor passage inlets and exits at substantially similar radial distances from said axis with each said exit facing in the general axial direction to discharge said fluid along the general direction of said axis, a plurality of axial flow guide vanes positioned in said inlet duct upstream adjacent to said rotor with guide vane flow passages between said vanes, said guide vanes being curved and positioned to direct fluid toward said rotor counter to the direction of rotation of said rotor blades to increase the range of volume flow per revolution of said rotor, and a plurality of peripherally spaced stator blades in said exit duct extending spanwise in the general radial direction with stator flow passages therebetween for receiving said fluid from said rotor passages, radially opposite walls of said exit duct diverging radially outward one relative to the other wall thereof reducing the cross sectional areas of said stator passages rearward from the inlets thereof over the major portion of the axial lengths of said stator blades to accelerate flows of said fluid therein to accommodate said increased range of volume flow of said fluid through said rotor passages, said guide vanes and stator blades cooperating to increase the range of volume flow through said compressor.

6. In combination in an axial flow compressor for raising the pressure of an elastic fluid, a case means comprising an inlet duct, a rotor case and an exit duct, a rotor having a hub mounted in said rotor case for rotation about an axis and defining a flow channel with said rotor case, said channel registering with said inlet and exit ducts to conduct a flow of fluid, and a plurality of peripherally spaced axial flow blades carried on said hub with rotor flow passages between said blades for conducting said fluid, a plurality of axial flow guide vanes positioned in said inlet duct upstream adjacent to said rotor with guide vane flow passages between said vanes, said guide vanes being curved and positioned to direct fluid toward said rotor counter to the direction of rotation of said rotor blades to increase the range of volume flow per revolution of said rotor, and a plurality of peripherally spaced stator blades in said exit duct extending spanwise in the general radial direction with stator flow passages therebetween for receiving said fluid from said rotor passages, the radially opposite walls of said exit duct diverging radially outward one relative to the other wall thereof reducing the cross sectional areas of said stator passages rearward from the inlets thereof over the major portion of the axial lengths of said stator blades to accelerate flows on said fluid therein to accommodate said increased range of volume flow of said fluid through said rotor passages, the portion of the wall of said exit duct extending along the radially outer ends of said stator blade being closed to a flow of said fluid through said wall over a major portion of the axial length of said stator blades between the leading and trailing edges thereof, said guide vanes and stator blades cooperating with said rotor to increase the range of volume flow through said compressor.

7. In combination in an axial flow compressor for raising the pressure of an elastic fluid, a case means comprising an inlet case having an inlet duct, a rotor case and a stator case having an exit duct, a rotor having a hub mounted in said rotor case for rotation about an axis and defining with said rotor case an annular flow channel extending through said inlet duct, said rotor, and said exit duct, a plurality of peripherally spaced axial flow blades carried on said hub with rotor flow passages between said blades, a plurality of peripherally spaced stator blades in said exit duct adjacent said rotor, said rotor blades tending to limit the range of fluid volume flow through said annular flow channel near the radially outer ends of said blades thereof, and means to extend said range of fluid volume flow in said compressor comprising a plurality of vanes positioned in said inlet duct upstream adjacent to said rotor, said vanes being curved in a direction opposite to the direction of rotation of said rotor to direct fluid toward said rotor blades counter to their direction of rotation, said annular flow channel having a center line extending through said rotor and in the portion of said inlet and exit ducts immediately adjacent thereto which is curved in an axial plane to be convex to the axis of rotation.

References Cited in the file of this patent

UNITED STATES PATENTS

| | | |
|---|---|---|
| 814,804 | Rateau | Mar. 13, 1906 |
| 1,734,541 | Tedman | Nov. 5, 1929 |
| 2,314,058 | Stalker | Mar. 16, 1943 |
| 2,397,060 | Szydlowski | Mar. 19, 1946 |
| 2,435,236 | Redding | Feb. 3, 1948 |
| 2,436,087 | Benson | Feb. 17, 1948 |
| 2,628,768 | Kantrowitz | Feb. 17, 1953 |
| 2,659,528 | Price | Nov. 17, 1953 |

FOREIGN PATENTS

| | | |
|---|---|---|
| 278,098 | Switzerland | Jan. 16, 1952 |
| 375,065 | Germany | May 8, 1923 |
| 724,553 | Germany | Aug. 29, 1942 |
| 841,784 | Germany | June 19, 1952 |
| 937,825 | France | Mar. 22, 1948 |